March 28, 1933.

A. H. SAAR, JR

TIME CONTROLLED SWITCH

Re. 18,780

Original Filed May 15, 1931

Inventor

Adolf H. Saar, Jr.

By Clarence O'Brien

Attorney

Reissued Mar. 28, 1933 Re. 18,780

UNITED STATES PATENT OFFICE

ADOLF H. SAAR, JR., OF OMAHA, NEBRASKA

TIME CONTROLLED SWITCH

Original No. 1,885,482, dated November 1, 1932, Serial No. 537,703, filed May 15, 1931. Application for reissue filed January 20, 1933. Serial No. 653,909.

This invention relates to new and useful improvements in switches, and more particularly to a switch for controlling radios, lighting circuits, and various other electrical systems and devices.

The principal object of this invention is to provide a time-controlled switch employing a multiplicity of connectors which can be readily manipulated to complete the timing action, so that an electrical system or device can be operated over a predetermined period of time.

During the course of the following specification and claim, other important objects and advantages of the invention will become apparent to the reader.

In the drawing:—

Figure 1:
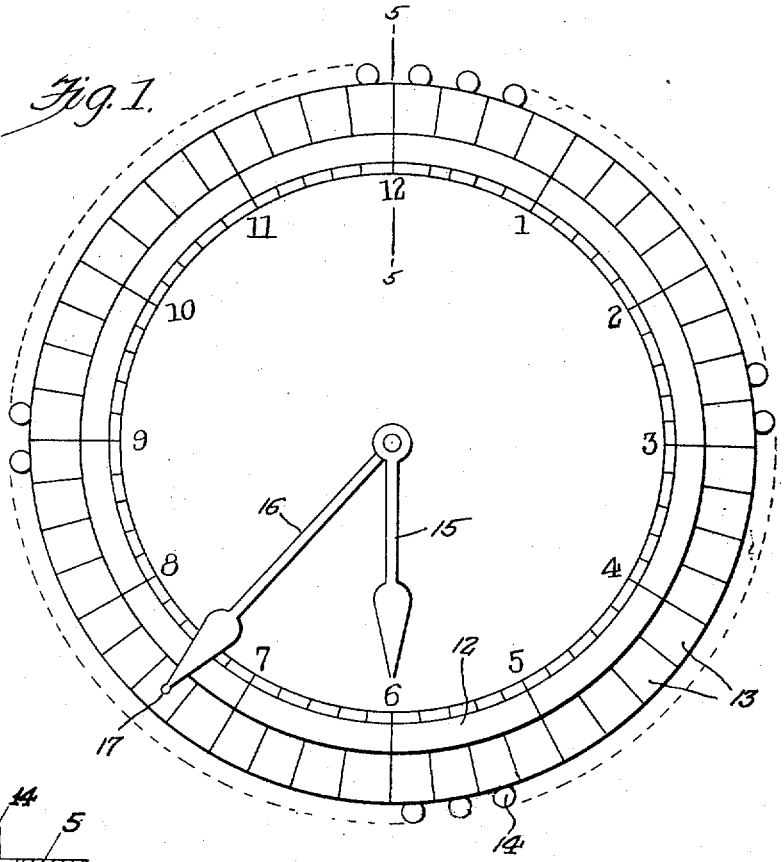
Figure 1 represents a front elevational view of the clock and switch mechanism.
Figure 3:
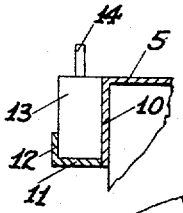
Fig. 3 represents a perspective view of one of the conductor segments.
Figure 2:
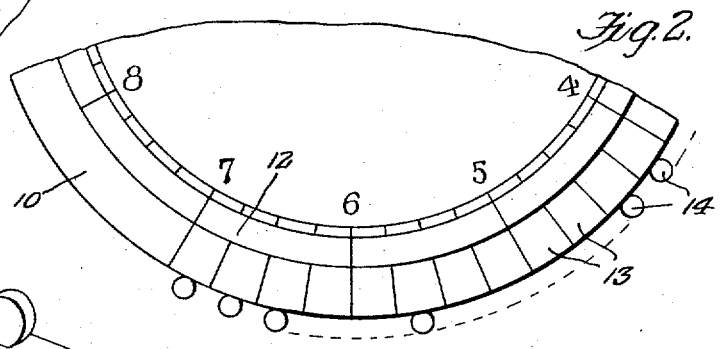
Fig. 2 represents a fragmentary front elevational view of the clock and switch mechanism.
Figure 4:
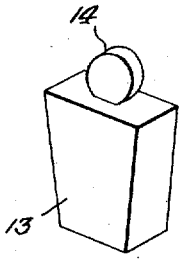
Fig. 4 represents a fragmentary detailed sectional view taken substantially on the line 5—5 of Fig. 1.

Referring to the drawing wherein like numerals designate like parts, it can be seen that the invention involves a clock which includes a casing 5 in which the usual clock mechanism is housed. Numeral 7 represents the usual hand setting key.

The casing 5 has a flange 10 at the front side of the block and this flange is provided with an annulus 11, having an outwardly projecting circumferentially extending flange 12. The flanges 10 and 12 as well as the annulus 11 serve to provide a guide plate for the reception of the current conductive segmental blocks 13, each of which is provided with a finger engageable lug 14 at its outer end.

Referring to Fig. 1, it will be found that the minute hand 15 does not engage the block 13, but that the hour hand 16 is provided with a small contact head 17 at its outer end, offset for wiping engagement with the blocks 13, when the blocks are properly braced in between the flanges 10 and 12. The above will afford the understanding that the minute and hour hands 15 and 16 respectively are reversed as regards their lengths in respect to the standard comparison of clock hands.

Obviously, the blocks 13 can be assembled as in the manner shown in Fig. 1, for the continuous reception of a program in the event the switch is hooked up to a radio receiver. Should it be desired to cut out a certain program over a period of fifteen minutes, the block opposite the time period during which the particular undesired program is to be broadcasted, is removed, so that when the hour hand arrived at this point, the circuit will open and the hour hand will continue until it reaches the next block, over this space from which the blocks have been removed.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

In a clock switch, a clock casing provided with a dial opening, the edge portion of the casing at the opening being provided with an inwardly disposed circumferentially extending flange, an annular wall extending outwardly from the flange and provided with a backwardly disposed circumferentially extending flange defining a trough, and removably disposed conductor blocks in the trough for engagement by one hand of the clock.

In testimony whereof I affix my signature.

ADOLF H. SAAR, JR.